UNITED STATES PATENT OFFICE.

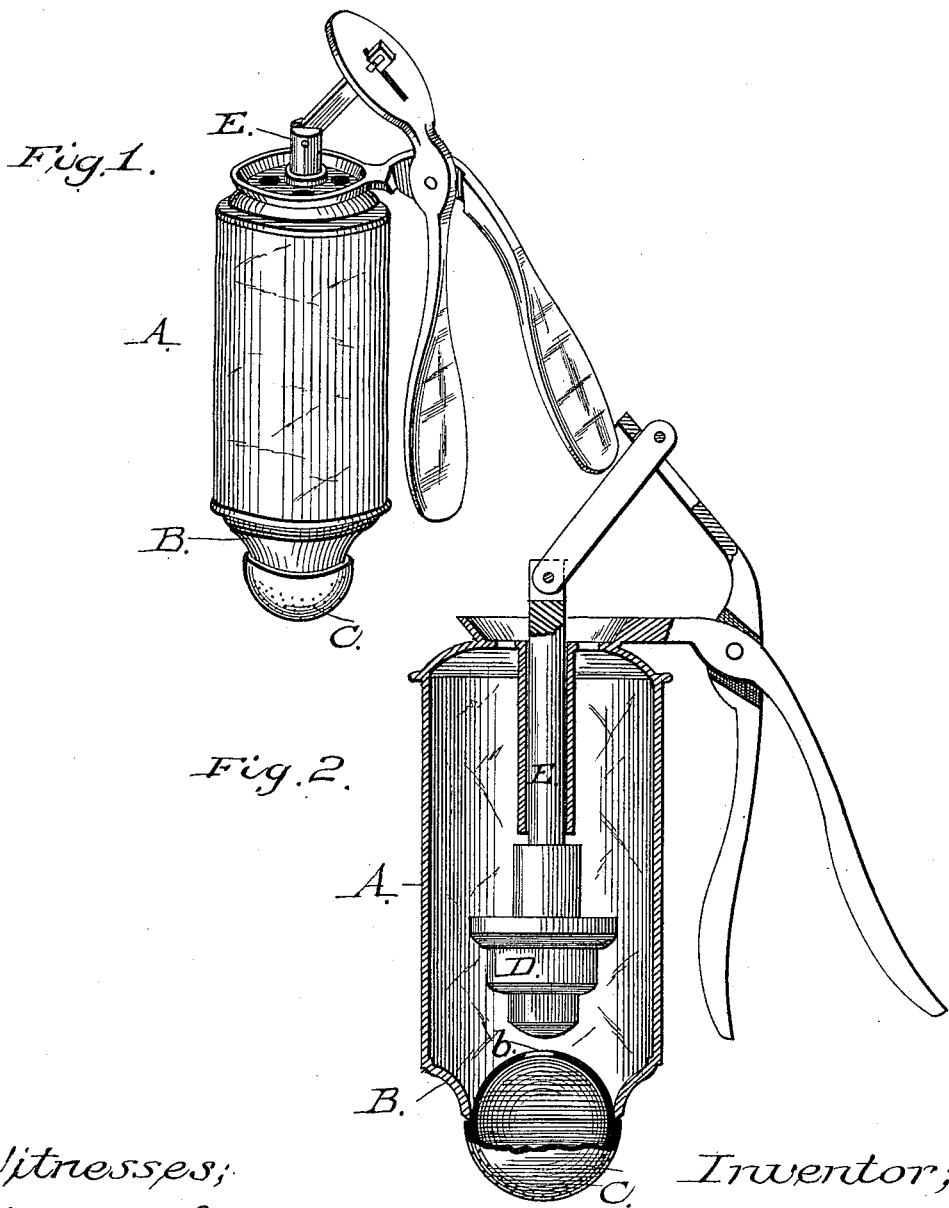

MOSES GOLDMAN, OF PITTSFIELD, MASSACHUSETTS.

SPRINKLER AND ATOMIZER.

SPECIFICATION forming part of Letters Patent No. 320,346, dated June 16, 1885.

Application filed July 2, 1884. (No model.)

*To all whom it may concern:*

Be it known that I, MOSES GOLDMAN, of Pittsfield, in the county of Berkshire, in the State of Massachusetts, have invented a new and useful Improvement in Sprinklers and Atomizers, of which the following is a full, clear, and exact description, reference being had to the accompanying drawings, making a part of this specification, in which—

Figure 1 is a perspective view of a sprinkler with my improvements attached. Fig. 2 is a vertical section of the same.

This invention relates to that class of sprinklers where only very fine jets or sprays are required, and is an improvement on Patent No. 293,730, granted to me on the 19th day of February, 1884; and it consists in the combination and arrangement of devices hereinafter described and claimed.

In my patent above referred to it is necessary to immerse the elastic ball or vessel in water in order to refill it each time after the liquid has been exhausted. My present invention is designed to furnish a convenient and constant supply of water to the elastic vessel, and thus avoid the annoyance and inconvenience of constantly dipping the sprinkler in order to refill it.

In the drawings, A represents a tank, of any desired size and form, in the bottom of which is fitted the holder B, adapted to fit and grasp elastic vessel C, perforated as shown and described in my former patent. The plunger D is provided with a rod, E, by which it may be forced down on the elastic vessel to force the water from the same. When the plunger is raised, the induction-port $b$ is exposed, and the vessel again fills with water from the surrounding tank A. The sprinkling is effected by forcing the plunger down on the elastic vessel, the plunger first coming over the port $b$ and thus closing it, when the compression of the vessel C forces the water in fine spray through the perforations in the bottom of the vessel.

Having thus described my invention, what I claim as new, and desire to secure by Letters Patent, is—

The tank A, provided with a holder, B, in combination with an elastic perforated vessel, C, a rod, E, and a plunger for compressing the vessel, substantially as and for the purpose set forth.

MOSES GOLDMAN.

Witnesses:
   H. B. APPLEWHAITE,
   S. WALTER FOWLER.